June 3, 1952            W. FRED            2,598,778
ICE FISHING TILTS
Filed April 19, 1950
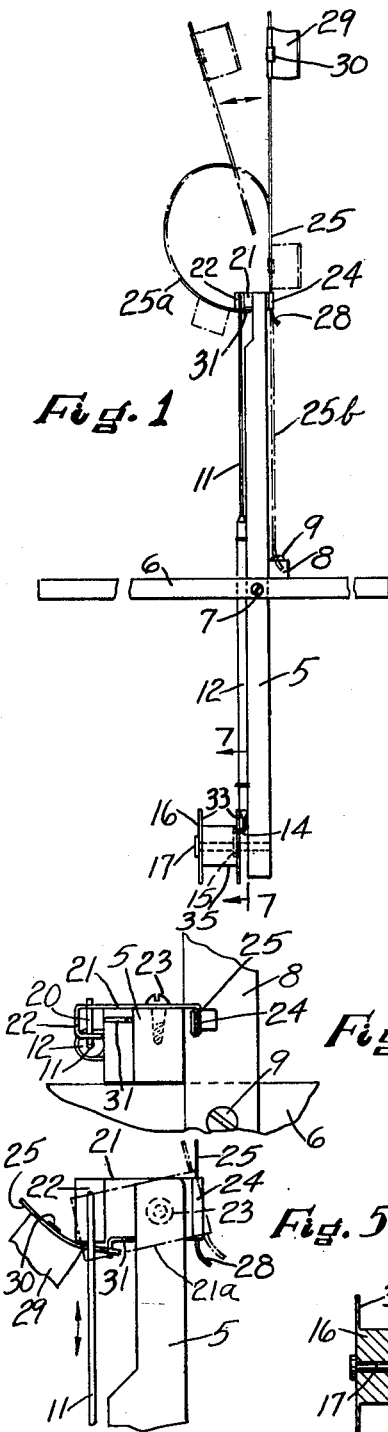
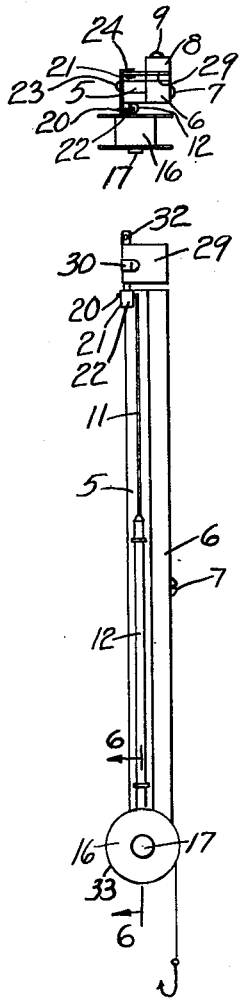
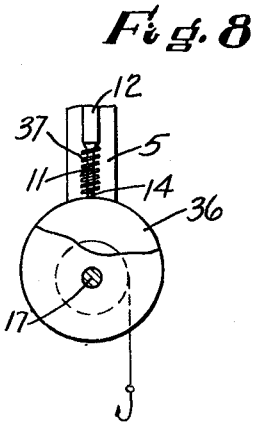
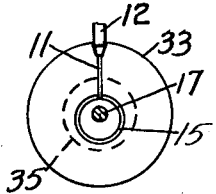
Inventor
WALTER FRED Patented June 3, 1952

2,598,778

UNITED STATES PATENT OFFICE 2,598,778

ICE FISHING TILT

Walter Fred, Worcester, Mass.

Application April 19, 1950, Serial No. 156,385

3 Claims. (Cl. 43—17)

The invention relates to signal devices used when fishing through the ice.

One object of the invention is to provide a simple, sturdy, inexpensive, and easily packed fishing device.

Another object of the invention is to provide a fishing device which gives a signal when a fish has taken the bait.

Another object of the invention is to provide a fishing device which gives a further visible signal indicating that the fish is running away with the bait.

A further object of the invention is to provide a fishing device which gives one visible signal when the fish initially takes the bait, and a further visible signal to indicate that the fish is running with the bait.

A still further object of the invention is to provide a fishing device which gives one visible signal in which a flag goes up when the fish initially takes the bait and a further visible signal by waving of the flag to indicate that the fish is running with the bait. Other objects will be apparent from the foregoing disclosure.

This invention accordingly consists in the features of construction, combination of elements, and arrangements of parts as will be exemplified in the structure to be hereinafter described, and the scope of the application of which will be indicated in the following claims.

In the accompanying drawings, in which is shown one of various possible embodiments of the mechanical features of the invention, Fig. 1 is a side elevation of the signal device with the signal flag released;

Fig. 2 is a front elevation of the signal device in a folded condition;

Fig. 3 is a plan view of the folded signal device;

Fig. 4 is an enlarged fragmentary plan view of the signal device;

Fig. 5 is an enlarged fragmentary view of the signal device in latched position;

Fig. 6 is an enlarged sectional view taken along line 6—6 of Fig. 2;

Fig. 7 is an enlarged sectional view taken along line 7—7 of Fig. 1; and

Fig. 8 is a modification of a part of the signal device.

As shown in Fig. 1 the invention comprises a vertically arranged member 5 to which is pivotally mounted a supporting member 6 by a screw 7, on which is pivotally mounted another cross member 8 by a screw 9, which supports the vertical member 5 as it depends through the ice. The members 6 and 8 cross one another and serve as a support for the tilt, as shown in Fig. 1 and Fig. 4, and fold into the position shown in Fig. 2 and Fig. 3 when the device is not in use.

Referring to Fig. 1 and Fig. 6 the member 5 carries a shaft 11 which is slidably mounted within a tube 12 between which is a clearance filled with grease 13 to prevent the shaft 11 from freezing. At its lower end the shaft 11 has an outwardly bent portion 14 which is inserted in a cam or eccentric groove 15 in a reel 16 rotatably mounted on a stud 17 which is connected to the member 5. At its upper end, shaft 11 has another bent portion 20 as shown in Fig. 2 and Fig. 4 which passes through holes in a U-shaped portion 22 of a lever 21. This prevents the shaft 11 from rotating in the tube 12 and the outwardly bent portion 14 in the cam or eccentric groove 15 in reel 16.

The lever 21 is pivotally mounted intermediate its ends on the upper end of the member 5 by a screw 23. The other end of lever 21 has another U-shaped portion 24 in which is slidably mounted a spring strip 25 which has a flag 29 fastened to its upper end by a clip 30. A bent out portion 28 at its lower ends acts to bind the spring strip 25 in its extreme upward position in the U-shaped portion 24 as shown in Fig. 1 and Fig. 5.

Referring to Figs. 1, 2, 4, and 5 the spring strip 25 has a hole 32 in its upper end by which it is held in the position 25a by a screw hook 31 which may be inserted through said hole, said screw being secured to the member 5. When not in use the spring strip 25 is placed in the position 25b.

Referring to Fig. 6 and Fig. 7 the reel 16 has two flanges 33 which guide the fishing line while it is being wound about the hub 35. Near its center, but not concentric with its center of rotation, is a cam or eccentric groove 15 or track cam as it is sometimes called, into which the portion 14 of the shaft 11 is inserted.

It can be clearly seen that this arrangement causes the shaft 11 to oscillate vertically as the reel is rotated about the stud 17. Also by placing the cam or eccentric groove 15 as near the center as possible and making the hub 35 as large as possible and concentric with the stud 17 will act as a lever, so that the slightest tug on the line will rotate the reel and oscillate the shaft 11 vertically thereby releasing and waving of the spring strip 5 to which is fastened the flag 29.

Referring to Fig. 8 which is a modification of the reel 16, has a cam or eccentric flange 36 instead of a groove 15. This also causes the shaft 11 to be oscillated vertically when the reel is rotated about the stud 17. A spring 37 is mounted between the portion 14 of the shaft 11 and the tube 12 to keep the portion 14 of the shaft 11 in contact at all times with the cam or eccentric flange 36. The cam or eccentric flange causes the shaft 11 to move upward and the spring moves it in the opposite direction as the reel is rotated.

The operation of the improved fishing device will be readily apparent from the foregoing disclosure.

With the device set up as shown in Fig. 1 and Fig. 5 with the spring strip hooked as shown by the position 25a, a pull on the line causes the reel to rotate and the shaft 11 to be moved downward by the cam or eccentric groove 15. This in turn pulls down on the lever 21 causing it to take the position 21a which releases the spring strip 25 by forcing it off the hook 31 as the lever 21 is moved downward. This gives the first visible signal that a fish has initially taken the bait. If the fish runs with the bait, a second visible signal is given by the waving of the flag 29 attached to the spring strip 25 as long as the reel is kept rotating by the pull of the fish on the line which is attached to the hub 35 of the reel 16.

It will thus be seen there has been provided by this invention apparatus in which the various objects hereinabove set forth together with many thoroughly practical advantages successfully achieved. As many possible embodiments may be made of the above invention and as many changes might be made in the embodiment above set forth, it is to be understood that all matters hereinbefore set forth or shown in the accompanying drawings is to be interpreted as illustrative and not in a limiting sense.

I claim:

1. In a fishing tilt, an upright support, a rocker arm pivotally supported adjacent to the upper end of said support, a flat spring one end of which is supported intermediate its ends on one end of said rocker arm, a signal flag on said spring adjacent to the free end thereof, means including a pin on said support to latch the flag end of said spring in a bowed position, said rocker arm serving when oscillated to release the spring from the pin, a fish line reel rotatably supported adjacent to the lower end of said support, and means including a reciprocable shaft between the other end of said arm and the reel whereby rotation of said reel serves initially to release said spring so that the flag goes up and thereafter to wave said flag in a vertical plane.

2. In a fishing tilt, an upright support, a rocker arm pivotally supported intermediate its ends adjacent to the upper end of said support, a flat spring having one end supported on one end of said rocker arm, a signal flag on said spring adjacent to the free end thereof, a hook on said support to latch the flag end of said spring in a bowed position, a fish line reel rotatably supported adjacent to the lower end of said support, a slidably mounted rod on said support, pivotal connections between the upper end of said rod and the rocker arm, and means including a cam on said reel to reciprocate said rod so as to oscillate said arm, the initial rocking of said arm serving to release said spring so that the tension of the spring swings the flag to a substantially vertical position and continued oscillation of the rocker arm serves to wave said spring and flag in a substantially vertical plane.

3. In a fishing tilt, an upright support, a rocker arm pivotally supported intermediate its ends adjacent to the upper end of said support, a flat spring one end of which is connected to one end of said rocker arm, a signal flag on the spring adjacent to the free end thereof, a hook on said support to latch the flag end of said spring in a bowed position, said rocker arm serving when oscillated to release the spring from said hook, a fish line reel rotatably supported adjacent to the lower end of said support, a vertically arranged tube on said support, a rod slidably mounted in said tube, a pivotal connection between the upper end of said rod and the other end of the rocker arm, and operative connections between said reel and rod which is arranged so that rotation of said reel serves to reciprocate said rod and thereby to oscillate said arm, to release said flag and to wave said spring and flag in a substantially vertical plane.

WALTER FRED.

REFERENCES CITED

The following references are of record in the file of this patent:

UNITED STATES PATENTS

| Number | Name | Date |
| --- | --- | --- |
| 2,089,097 | Millett | Aug. 3, 1937 |
| 2,502,231 | Oberg | Mar. 28, 1950 |
| 2,518,517 | Baulski | Aug. 15, 1950 |